(12) United States Patent
Niklas et al.

(10) Patent No.: US 11,581,617 B2
(45) Date of Patent: Feb. 14, 2023

(54) ELECTROCHEMICAL ENERGY STORAGE UNITS, SENSOR DEVICES AND ASSOCIATED METHODS

(71) Applicant: Infineon Technologies AG, Neubiberg (DE)

(72) Inventors: Alfred Niklas, Poing (DE); Sebastian Ladurner, Munich (DE)

(73) Assignee: Infineon Technologies AG, Neubiberg (DE)

( * ) Notice: Subject to any disclaimer, the term of this patent is extended or adjusted under 35 U.S.C. 154(b) by 111 days.

(21) Appl. No.: 17/211,584

(22) Filed: Mar. 24, 2021

(65) Prior Publication Data

US 2021/0313663 A1 Oct. 7, 2021

(30) Foreign Application Priority Data

Apr. 6, 2020 (DE) .......................... 102020109544.9

(51) Int. Cl.
*H01M 50/578* (2021.01)
*H01M 10/42* (2006.01)
*H01M 10/0525* (2010.01)
*H01M 10/48* (2006.01)
*B60L 58/10* (2019.01)

(52) U.S. Cl.
CPC .......... *H01M 50/578* (2021.01); *B60L 58/10* (2019.02); *H01M 10/0525* (2013.01); *H01M 10/425* (2013.01); *H01M 10/48* (2013.01); *H01M 2010/4271* (2013.01); *H01M 2220/20* (2013.01)

(58) Field of Classification Search
None
See application file for complete search history.

(56) References Cited

U.S. PATENT DOCUMENTS

2018/0261824 A1* 9/2018 Ju .................... H02J 7/00719

FOREIGN PATENT DOCUMENTS

| CN | 103376171 A | 10/2013 |
| DE | 102014204956 A1 | 9/2015 |
| DE | 102017219273 A | 5/2019 |
| EP | 2869391 A1 | 5/2015 |

\* cited by examiner

*Primary Examiner* — Wyatt P McConnell
(74) *Attorney, Agent, or Firm* — Harrity & Harrity, LLP

(57) ABSTRACT

A method comprises determining a first pressure increase in an electrochemical energy storage unit based on a first repetition rate, detecting that the first pressure increase has exceeded a first threshold value, determining a second pressure increase in the energy storage unit based on a second repetition rate, the second repetition rate being greater than the first repetition rate, detecting that the second pressure increase exceeds a second threshold value, and outputting a signal to a control unit based on detecting that the second pressure increase has exceeded the second threshold value.

22 Claims, 3 Drawing Sheets

ELECTROCHEMICAL ENERGY STORAGE UNITS, SENSOR DEVICES AND ASSOCIATED METHODS

CROSS REFERENCE TO RELATED APPLICATION

This application claims priority to German Patent Application No. 102020109544.9 filed on Apr. 6, 2020, the content of which is incorporated by reference herein in its entirety.

TECHNICAL FIELD

The present disclosure relates to, for example, electrochemical energy storage units, sensor devices and related methods.

BACKGROUND

Electrochemical energy storage devices, such as lithium-ion accumulators, can be used in electric vehicles, for example. A thermal runaway of individual cells of an energy storage unit can lead to a temperature rise in neighboring cells, to generation of gas and a pressure increase in the energy storage unit and ultimately to a fire in the energy storage unit and, in the worst case, in the vehicle. In such a case, passengers of the vehicle should be warned within a prescribed time in order to be able to exit the vehicle in good time.

BRIEF DESCRIPTION

The present disclosure relates to providing devices with low energy consumption and associated operating methods. Various aspects relate to a method. The method comprises determining a first pressure increase in an electrochemical energy storage unit based on a first repetition rate. The method also comprises detecting that the first pressure increase has exceeded a first threshold value. The method also comprises determining a second pressure increase in the energy storage unit based on a second repetition rate, the second repetition rate being greater than the first repetition rate. The method also comprises detecting that the second pressure increase has exceeded a second threshold value. The method also comprises outputting a signal to a control unit based on detecting that the second pressure rise has exceeded the second threshold value.

Various aspects relate to a sensor device. The sensor device comprises a pressure sensor. The pressure sensor is configured for determining a first pressure increase in an electrochemical energy storage unit based on a first repetition rate. The pressure sensor is also configured for detecting that the first pressure increase has exceeded a first threshold value. The pressure sensor is also configured for determining a second pressure increase in the energy storage unit based on a second repetition rate, with the second repetition rate being greater than the first repetition rate. The pressure sensor is also configured for detecting that the second pressure increase has exceeded a second threshold value. The pressure sensor is further configured for outputting a signal to a control unit based on detecting that the second pressure rise has exceeded the second threshold value.

BRIEF DESCRIPTION OF THE DRAWINGS

Methods and devices according to the disclosure are described in more detail in the following with the aid of drawings. The elements shown in the drawings are not necessarily reproduced true to scale relative to each other. Identical reference signs can refer to identical components.

DETAILED DESCRIPTION

Figure 1:
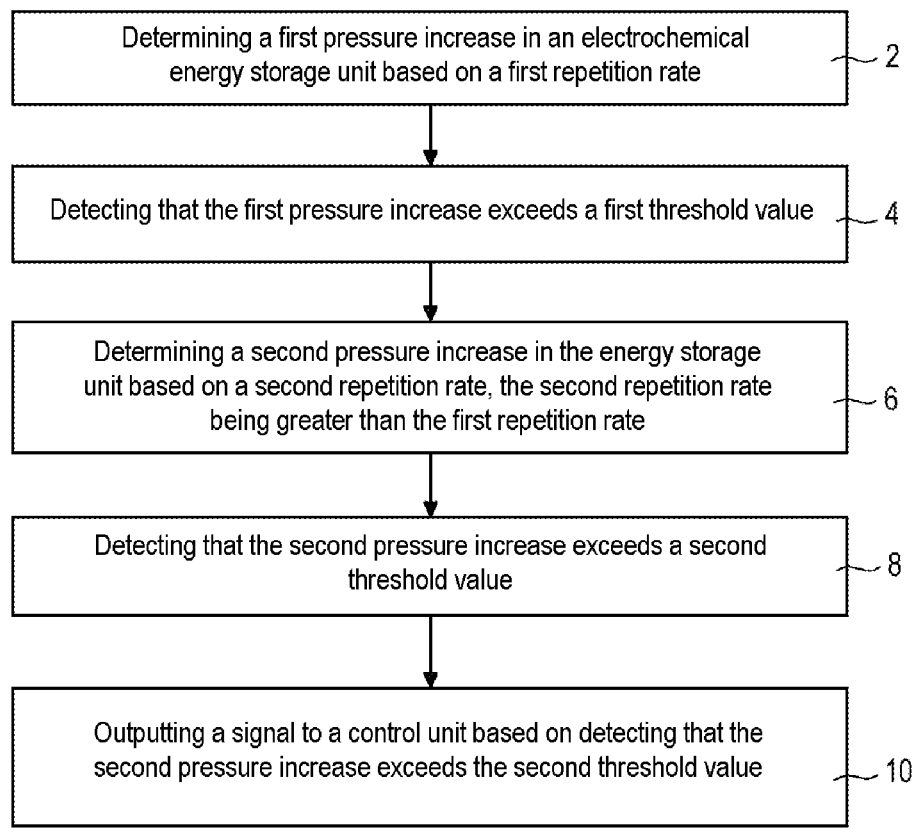
FIG. 1 shows a flow diagram of a method according to the disclosure.

The method of FIG. 1 is presented in a general form, in order to describe aspects of the disclosure in qualitative terms. The method can have further aspects, which for the sake of simplicity are not shown or described in FIG. 1. The method may be extended by one or more aspects described in conjunction with other examples according to the disclosure. For example, the method can be extended by one or more of the aspects that are described in conjunction with the method of FIG. 2.

At step 2, a first pressure increase in an electrochemical energy storage unit can be determined based on a first repetition rate. At step 4, it can be detected that the first pressure increase exceeds a first threshold. At step 6 a second pressure increase in the energy storage unit can be determined based on a second repetition rate, the second repetition rate being greater than the first repetition rate. At step 8, it can be detected that the second pressure increase exceeds a second threshold value. At step 10 a signal can be output to a control unit based on detecting that the second pressure increase has exceeded the second threshold value.

Figure 2:
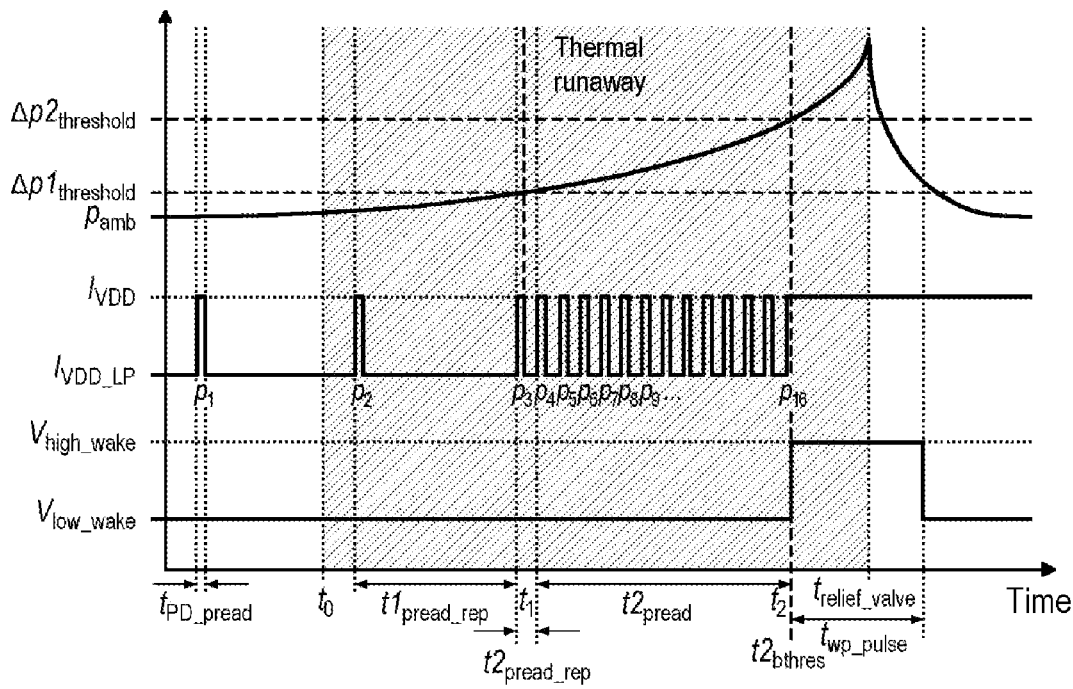
FIG. 2 illustrates a method according to the disclosure using a timing diagram.

In FIG. 2, a method according to the disclosure is illustrated using a timing diagram. The method of FIG. 2 can be considered a more detailed implementation of the method of FIG. 1. The timing diagram of FIG. 2 is based on the scenario of an electrochemical energy storage unit in which a sensor device according to the disclosure monitors the pressure, in particular absolute pressure, prevailing in the energy storage unit using a pressure sensor. The electrochemical energy storage unit can be, for example, a battery of a vehicle, in particular an electric vehicle. For example, the electric vehicle can be of one of the following types: BEV (Battery Electric vehicle), PHEV (Plug-in Hybrid Electric vehicle), FHEV (Full Hybrid Electric vehicle), MHEV (Mild Hybrid Electric vehicle), etc. Based on pressure measurements, pressure pulses can be detected in the electrochemical energy storage unit and used to deduce a thermal runaway of the energy storage unit. The pressure measurements can be, in particular, absolute pressure measurements and/or relative pressure measurements. The method described in conjunction with FIG. 2 can be based in particular on absolute pressure measurements, but is not limited to them. In the following, for the sake of simplicity, the term absolute pressure or absolute pressures will be used. On the vertical axis of the timing diagram, different quantities are plotted against time, shown along the horizontal axis. The variables are an absolute pressure $p_{amb}$ prevailing in the electrochemical energy storage unit, a current consumption $I_{VDD}$ of the pressure sensor and $V_{high/low\_wake}$ of an output signal.

Firstly, the pressure sensor can wake up automatically or be automatically woken up to begin its operation. For example, a wake-up signal can be provided by a control unit electrically coupled to the pressure sensor. In an example, the pressure sensor can wake up automatically and begin its operation at a time when the electric vehicle is in a stationary state, e.g. as soon as the speed of the electric vehicle is zero. A stationary state of the electric vehicle can correspond, for example, to a parked state of the electric vehicle or to a waiting state of the electric vehicle, for example at a traffic light or a railway crossing. Quite generally, according to the disclosure the methods described herein may be carried out, in particular, during a stationary state of an electric vehicle.

After waking up, the pressure sensor may be configured to monitor the absolute pressure $p_{amb}$ in the electrochemical energy storage unit during a first phase in order to detect any pressure increases or pressure pulses that occur. In the timing diagram of FIG. 2, the first phase can correspond to an operation of the pressure sensor before a time $t_1$. During a measurement of the absolute pressure, the pressure sensor can be in a measuring operating mode or in an awake state, and between measurements of the absolute pressure in a standby state. In the measuring mode, the pressure sensor can have a current consumption $I_{VDD}$ in a range from approximately 1 mA to approximately 10 mA, more precisely in a range from approximately 3 mA to approximately 5 mA. A typical example value of the current consumption $I_{VDD}$ in the measurement mode can be approximately 3.5 mA. In standby mode, the pressure sensor can have a current consumption $I_{VDD\_LP}$ in a range from approximately 1 μA to approximately 30 μA, more precisely in a range from approximately 1 μA to approximately 20 μA, still more precisely in a range from approximately 1 μA to approximately 10 μA. The absolute pressure can be measured by the pressure sensor during a time interval $t_{PD\_pread}$. The duration of the time interval $t_{PD\_pread}$ can lie in a range from approximately 1 ms to approximately 15 ms. An example value of the time interval $t_{PD\_pread}$ can be approximately 10 ms.

The pressure sensor can measure the absolute pressure in the energy storage unit in consecutive measurements at a first repetition rate. In the example of FIG. 2, three measurements $p_1$, $p_2$ and $p_3$ are shown, which are performed at the first repetition rate. A first time interval $t1_{pread\_rep}$ between two consecutive measurements can (typically) lie in a range from approximately 10 ms to approximately 5000 ms, more precisely in a range from approximately 100 ms to approximately 5000 ms, still more precisely in a range from approximately 1000 ms to approximately 5000 ms. For example, the first repetition rate can correspond to an inverse of the first time interval $t1_{pread\_rep}$.

At a time to, the absolute pressure $p_{amb}$ in the energy storage unit can increase. FIG. 2 shows an example of a non-linear absolute pressure increase within the energy storage unit. In other examples, the curve of the pressure increase may also have a different form. In the first phase, the pressure increase in the energy storage unit can be monitored based on the first repetition rate or on absolute pressure measurements carried out at the first repetition rate. More precisely, differences between consecutive absolute pressure measurements can be formed and compared with a first threshold value $\Delta p1_{threshold}$. The first threshold value $\Delta p1_{threshold}$ can be in a range from approximately 10 mbar to approximately 200 mbar, more precisely in a range from approximately 10 mbar to approximately 100 mbar.

Firstly, a first pressure increase $\Delta p1_{amb}$ in the form of a difference p2−p1 can be compared with the first threshold value $\Delta p1_{threshold}$. The value p2 used here can be provided by a current measurement of the absolute pressure $p2_{actual}$ and the value p1 by an earlier measurement of the absolute pressure $p1_{register}$, which can be stored in a register or memory. In the example of FIG. 2, the pressure increase $\Delta p1_{amb}$ determined cannot yet exceed the threshold value $\Delta p1_{threshold}$. The pressure increase $\Delta p1_{amb}$ can then be determined again in the form of the difference p3−p2 or $p3_{actual}$−$p2_{register}$ (e.g. based on two directly consecutive measurements), or in the form of the difference p3−p1 or $p3_{actual}$−$p1_{register}$ (e.g. based on two not directly consecutive measurements) and compared with the first threshold value $\Delta p1_{threshold}$. In the example of FIG. 2, at time $t_1$ it can be detected that the determined pressure increase $\Delta p1_{amb}$ exceeds the threshold value $\Delta p1_{threshold}$, e.g. $\Delta p1_{amb} > \Delta p1_{threshold}$.

In a second phase, the sensor device can continue to monitor the absolute pressure $p_{amb}$ in the electrochemical energy storage unit. In the timing diagram of FIG. 2, the second phase can correspond to an operation of the pressure sensor after the time $t_1$. In particular, the reliability of a detection of the increase in pressure already detected during the first phase can be increased in order to rule out an incorrect detection of a thermal runaway of the energy storage unit. For this purpose the pressure sensor can measure the absolute pressure in the energy storage unit in consecutive measurements at a second repetition rate. The figure shows an example of 13 measurements $p_4$, $p_5$, ..., $p_{16}$, which are performed at the second repetition rate. A time interval $t2_{pread\_rep}$ between two consecutive measurements can (typically) lie in a range from approximately 10 ms to approximately 500 ms, more precisely in a range from approximately 10 ms to approximately 250 ms, still more precisely in a range from approximately 10 ms to approximately 100 ms. For example, the second repetition rate can correspond to an inverse of the second time interval $t2_{pread\_rep}$. In particular, the second repetition rate can be greater than the first repetition rate, e.g. $t2_{pread\_rep} < t1_{pread\_rep}$ may apply.

In the second phase, the pressure increase in the energy storage unit can be monitored based on the second repetition rate or on absolute pressure measurements carried out at the second repetition rate. More precisely, differences between consecutive absolute pressure measurements can be formed and compared with a second threshold value $\Delta p2_{threshold}$. The second threshold value $\Delta p2_{threshold}$ can lie in a range from approximately 10 mbar to approximately 500 mbar.

Firstly, a second pressure increase $\Delta p2_{amb}$ in the form of the difference p4−p3 can be compared with the second threshold value $\Delta p2_{threshold}$. The value p4 used here can be provided by a current measurement of the absolute pressure $p4_{actual}$ and the value p3 by an earlier measurement of the absolute pressure $p3_{register}$, which can be stored in a memory or register. In the example of FIG. 2, the pressure increase $\Delta p2_{amb}$ in the form of the difference p4−p3 cannot yet exceed the threshold value $\Delta p2_{threshold}$. The pressure increase $\Delta p2_{amb}$ can then be determined again in the form of the differences p5−p3, p6−p3, p7−p3, etc. (or $p5_{actual}$−$p3_{register}$, $p6_{actual}$−$p3_{register}$, $p7_{actual}$−$p3_{register}$, etc.) and compared in each case with the second threshold value $\Delta p2_{threshold}$ until at a time $t_2$ it is possible to detect that the determined pressure increase $\Delta p2_{amb}$ exceeds the second threshold value $\Delta p2_{threshold}$. In the example of FIG. 2, the pressure increase $\Delta p2_{amb}$ in the form of the difference p16−p3 (or $p16_{actual}$−$p3_{register}$) can exceed the second threshold value $\Delta p2_{threshold}$, e.g. $\Delta p2_{amb} > \Delta p2_{threshold}$. In this case, it can be assumed that thermal runaway is present in the energy storage unit. In FIG. 2, the process of thermal runaway and the associated pressure increase are shown within a hatched region.

It is clear that cases can occur in which the second threshold $\Delta p2_{threshold}$ is not exceeded and no thermal runaway is detected. In such cases, it may be desirable that the sensor device does not remain in the second phase for an unnecessarily long time, performing pressure measurements at the higher second repetition rate, which can lead to increased energy consumption. In this context, the sensor device can provide a setting of a maximum duration $t2_{pread}$ of the second phase. If no exceeding of the second threshold value $\Delta p2_{threshold}$ is detected after the period $t2_{pread}$ has elapsed, the sensor device can return to the operating mode of the first phase.

If at time $t_2$ it is detected that the second pressure increase exceeds the second threshold value, a signal can be output to a control unit. For example, the control unit can comprise a microcontroller of a battery monitoring system or of a module monitoring system. Examples of such systems are shown and described in FIGS. 5 and 6. For example, the signal can be a voltage pulse upon which a voltage value at an output of the sensor device or at an output of the pressure sensor can be set from a low voltage value $V_{low\_wake}$ to a high voltage value $V_{high\_wake}$ for a pulse duration of $t_{wp\_pulse}$. For example, the voltage value $V_{high\_wake}$ can have a value of up to approximately 5V. In one example, the output signal can comprise a wake-up signal which is configured to wake a control unit from a standby state.

Based on the output signal, one or more of the actions described below can be initiated, in particular by the control unit that has been transferred from a sleep mode into a waking mode.

In an example, a warning signal can be output based on the output signal. The warning signal can be used to warn passengers of the danger that can be caused by a thermal runaway of an energy storage unit, in particular a fire in the energy storage unit and/or a fire in the vehicle.

In a further example, pressure can be relieved from the energy storage unit based on the output signal. In FIG. 2, such a pressure relief can begin at a time $t_{relief\_valve}$ and result in a reduction of the absolute pressure in the energy storage unit, for example until a previous absolute pressure that prevailed before the pressure increase is restored. In one case, the pressure can be relieved by a mechanical pressure valve. Alternatively or additionally, the pressure can be relieved by an electromechanical valve or a solenoid valve, the opening and closing of which can be controlled by the control unit. Alternatively or additionally, the pressure can be relieved based on a membrane that can be perforated when a specified absolute pressure is exceeded in the energy storage unit.

In another example, the energy storage unit can be switched off, e.g. disconnected from a voltage supply or power supply, based on the output signal. If the energy storage unit comprises a battery of an electric vehicle, the battery can be disconnected from an on-board electrical network of the vehicle.

As already described above, between measurements of the absolute pressure, e.g. during its standby state, the pressure sensor can have a reduced current consumption in a range from approximately 1 µA to approximately 30 µA. The methods described herein can thus provide a monitoring function of an electrochemical energy storage unit with reduced energy consumption. In particular, the monitoring function can be provided during a stationary state of an electric vehicle, since the reduced energy consumption can prevent or at least reduce the likelihood of an unwanted (complete) discharge of the energy storage unit.

Figure 3:
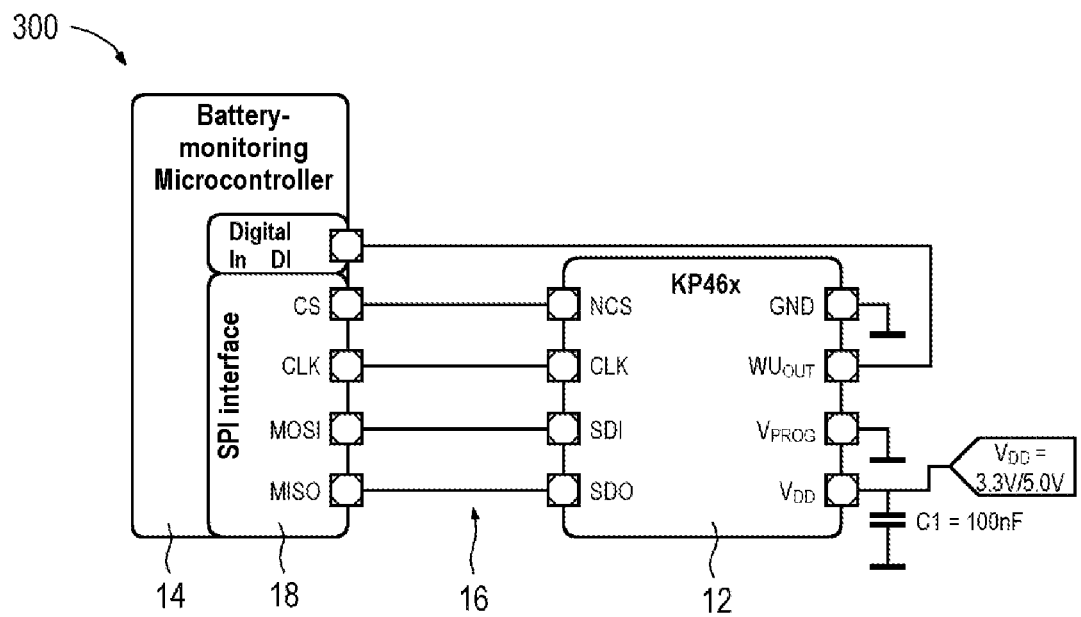
FIG. 3 schematically illustrates a sensor device 300 according to the disclosure.

FIG. 3 schematically illustrates a sensor device 300 according to the disclosure. The sensor device 300 can be used in an electrochemical storage unit, for example. In this context, the sensor device 300 may be configured to implement one of the methods of FIGS. 1 and 2. Comments in connection with FIGS. 1 and 2 can therefore also apply to the sensor device 300.

The sensor device 300 can have a pressure sensor 12 and a control unit 14. The control unit 14, for example, can comprise a microcontroller of a battery monitoring system or a module monitoring system. The control unit 14 may or may not be considered as part of the sensor device 300. The pressure sensor 12 can be configured to measure an absolute pressure. In particular, the pressure sensor 12 can be configured to monitor a pressure increase in an electrochemical energy storage unit based on consecutive measurements of the absolute pressure in the energy storage unit. The pressure sensor 12 can be in a measuring operating mode during the measurements and in a standby mode between the measurements. Possible values of a current consumption of the pressure sensor in the measuring mode and in the standby mode are described in connection with FIG. 2.

The pressure sensor 12 can have a plurality of terminals or pins. In the example of FIG. 3, the pressure sensor 12 can have a ground terminal GND, a programming terminal $V_{PROG}$ and a supply voltage terminal $V_{DD}$. In addition, the pressure sensor 12 can have a signal terminal $WU_{out}$, which is configured to output a signal to the control unit 14. The output signal can correspond to the output signal of FIG. 1. In particular, the output signal can comprise a wake-up signal, which is configured to wake the control unit 14 from a standby state. In one example, the signal can correspond to the voltage pulse shown in FIG. 2 with the value $V_{high\_wake}$. The control unit 14 can have a signal input DI (Digital In), which is configured to receive the signal output from the pressure sensor 12.

The pressure sensor 12 and the control unit 14 can be electrically connected to each other. In the example of FIG. 3, the pressure sensor 12 and the control unit 14 can be connected via an SPI (Serial Peripheral Interface) bus system 16. In other examples, the pressure sensor 12 and the control unit 14 may be electrically coupled to each other in other ways. In the case of the SPI bus system 16, the pressure sensor 12 can have the following signal inputs and signal outputs: NCS (Negative Chip Select), CLK (Clock), SDI (Serial Data in), SDO (Serial Data out). Similarly, the control unit 14 can have an SPI interface 18 with the following signal inputs and signal outputs: CS (Chip Select), CLK (Clock), MOSI (Master Output Slave Input), MISO (Master Input Slave Output). The control unit 14 can be configured to transfer the pressure sensor 12 into an operating mode via the bus system 16 using a control command, as described in FIG. 2. Such an operating mode can be initiated, in particular, in a stationary state of an electric vehicle.

The sensor device 300 can comprise further aspects that are not described in the example of FIG. 3 for the sake of simplicity. For example, the sensor device 300 can have a register or a memory, to and from which one or more absolute pressure readings recorded by the pressure sensor 12 can be written and read out.

Figure 4:
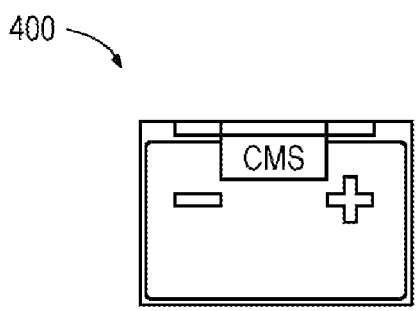
FIG. 4 schematically illustrates an electrochemical cell 400.

The electrochemical cell 400 of FIG. 4 can be a lithium-ion cell, for example. A plurality of such electrochemical cells 400 can be used to build electrochemical energy storage units, such as the examples shown and described in FIGS. 5 and 6. In this context, it should be noted that the electrochemical energy storage units described herein are not necessarily based solely on lithium-ion cells. Alternatively or in addition, the electrochemical energy storage units may also comprise one or more of sodium-ion batteries, magnesium-sulfur batteries, aluminum batteries, zinc-air batteries, or calcium batteries. One or more of these types of batteries may not necessarily be fully operationally ready at the time of this application, but may possibly be used at a later date in electrochemical energy storage units according to the disclosure. For example, the electrochemical cell 400 can provide an electrical voltage of up to approximately 5V. The electrochemical cell 400 can have a cell monitoring system (CMS). The CMS can be configured to monitor one or more cell parameters by using one or more microsensors.

Figure 5:
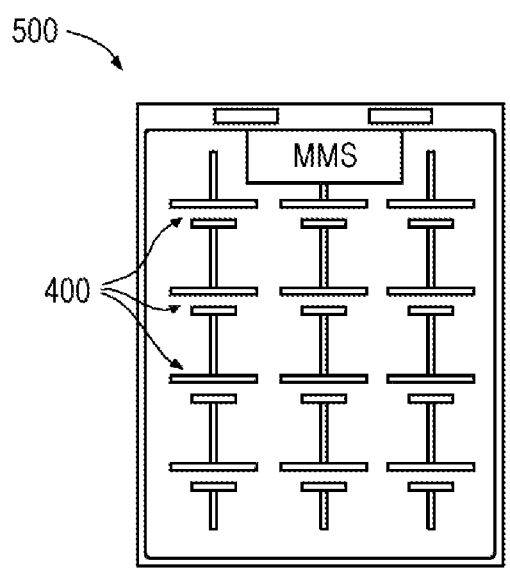
FIG. 5 schematically illustrates an electrochemical energy storage unit 500 according to the disclosure.

The electrochemical energy storage unit 500 of FIG. 5 can have a plurality of electrochemical cells 400. The electrochemical cells 400 can be connected in series. In the example of FIG. 5, twelve electrochemical cells 400 are shown as an example. In other examples, the number of electrochemical cells 400 can be chosen differently. In FIG. 5, for example, the electrochemical energy storage unit 500 can provide an electrical voltage of up to approximately 60V. The electrochemical energy storage unit 500 can have a module monitoring system (MMS), which can include, inter alia, a sensor device according to the disclosure and a control unit in the form of a microcontroller. The components of the MMS can be arranged on a common circuit board and electrically interconnected. In addition to a pressure monitoring described above using a sensor device according to the disclosure, the MMS can monitor or test one or more additional physical parameters of the energy storage unit 500, for example voltage, current, temperature, impedance, etc.

Figure 6:
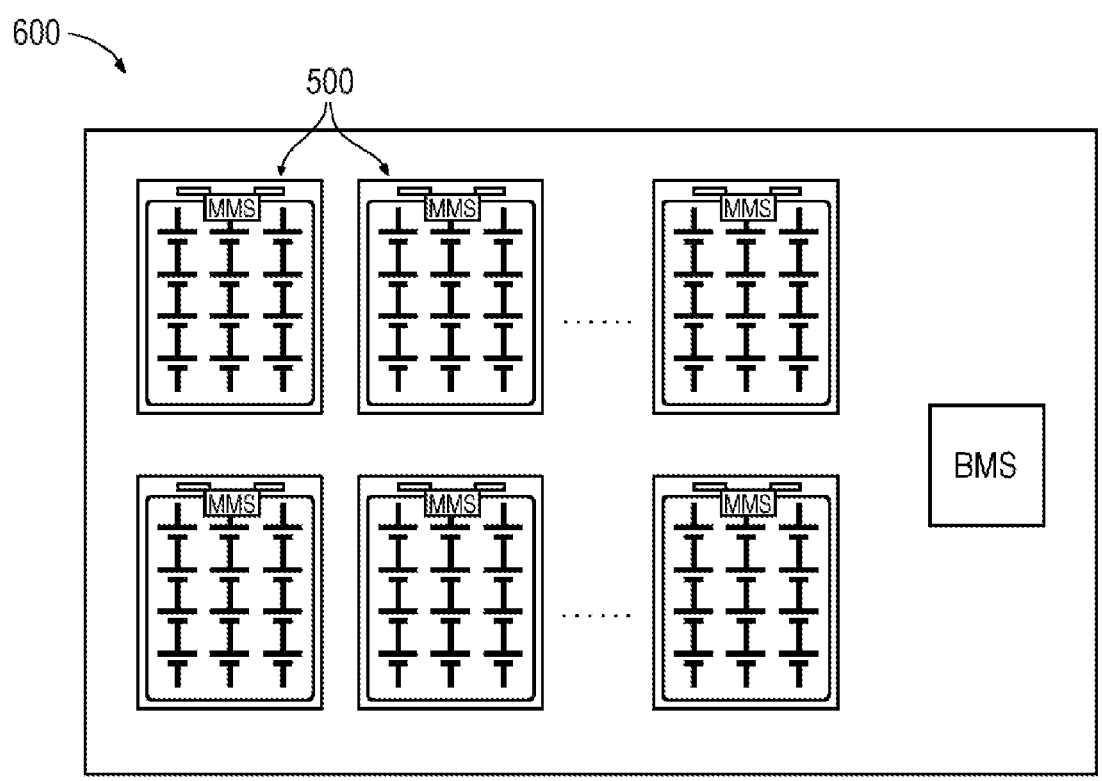
FIG. 6 schematically illustrates an electrochemical energy storage unit 600 according to the disclosure.

The electrochemical energy storage unit 600 of FIG. 6 can be composed of a plurality of smaller electrochemical energy storage units 500, as described in FIG. 5, for example. The electrochemical energy storage units 500 can be connected in series. The electrochemical energy storage unit 600 may be, for example, a battery of an electric vehicle. In FIG. 6, the electrochemical energy storage unit 600 can provide an electrical voltage of over approximately 60V. In particular, the supplied voltage can be in the range from approximately 400V to approximately 800V. The electrochemical energy storage unit 600 can have a battery monitoring system (BMS), which can include, inter alia, a sensor device according to the disclosure and a control unit in the form of a microcontroller. The components of the BMS can be arranged on a common circuit board and electrically interconnected. The BMS can provide similar functionality to the MMS of FIG. 5.

EXAMPLES

In the following, electrochemical energy storage units, sensor devices and associated methods are explained using examples.

Example 1 is a method comprising: determining a first pressure increase in an electrochemical energy storage unit based on a first repetition rate; detecting that the first pressure increase has exceeded a first threshold value; determining a second pressure increase in the energy storage unit based on a second repetition rate with the second repetition rate being greater than the first repetition rate; detecting that the second pressure increase exceeds a second threshold value; and outputting a signal to a control unit, based on detecting that the second pressure increase has exceeded the second threshold value.

Example 2 is a method according to example 1, wherein the output signal comprises a wake-up signal which is configured to wake the control unit from a standby state.

Example 3 is a method according to example 1 or 2, wherein the control unit comprises a microcontroller of a battery monitoring system or of a module monitoring system.

Example 4 is a method according to any one of the preceding examples, also comprising, based on the output signal, at least one of: outputting a warning signal; relieving pressure from the energy storage unit; switching off the energy storage unit; or disconnecting the energy storage unit from an on-board electrical network.

Example 5 is a method according to any one of the preceding examples, also comprising: detecting a thermal runaway of the energy storage unit based on detecting that the second pressure increase has exceeded the second threshold value.

Example 6 is a method according to any one of the preceding examples, wherein determining the first pressure increase comprises: performing consecutive measurements of the absolute pressure in the energy storage unit at the first repetition rate, wherein the first pressure increase is based on a difference between two first consecutive measurements of the absolute pressure.

Example 7 is a method according to example 6, wherein a first time interval between the two first consecutive measurements is in a range from 10 ms to 5000 ms.

Example 8 is a method according to example 6 or 7, wherein the two first consecutive measurements directly follow each other.

Example 9 is a method according to any one of the preceding examples, wherein determining the second pressure increase comprises: performing consecutive measurements of the absolute pressure in the energy storage unit at the second repetition rate, the second pressure increase being based on a difference between two second consecutive measurements of the absolute pressure.

Example 10 is a method according to example 9, wherein a second time interval between the two second consecutive measurements has a value in a range from 10 ms to 500 ms, or a multiple of this value.

Example 11 is a method according to example 9 or 10, further comprising: performing a plurality of measurements of the absolute pressure in the energy storage unit between the two second consecutive measurements at the second repetition rate.

Example 12 is a method according to any one of the preceding examples, wherein the first threshold value is in a range from 10 mbar to 200 mbar.

Example 13 is a method according to any one of the preceding examples, wherein the second threshold value is in a range from 10 mbar to 500 mbar.

Example 14 is a method according to any one of the preceding examples, wherein the energy storage unit comprises a battery for an electric vehicle.

Example 15 is a method according to example 14, wherein the method is carried out while the electric vehicle is stationary.

Example 16 is a method according to any one of the preceding examples, wherein the energy storage unit comprises a lithium-ion accumulator.

Example 17 is a sensor device, comprising: a pressure sensor, the pressure sensor being configured for: determining a first pressure increase in an electrochemical energy storage unit based on a first repetition rate; detecting that the first pressure increase has exceeded a first threshold value; determining a second pressure increase in the energy storage unit based on a second repetition rate, with the second repetition rate being greater than the first repetition rate; detecting that the second pressure increase exceeds a second threshold value; and outputting a signal to a control unit based on detecting that the second pressure increase has exceeded the second threshold value.

Example 18 is a sensor device according to example 17, the pressure sensor being configured to determine a pressure increase in the energy storage unit based on consecutive measurements of the absolute pressure in the energy storage unit, wherein the pressure sensor is in a measuring operating mode during the measurements and in a standby state between the measurements.

Example 19 is a sensor device according to example 18, wherein in the measuring operating mode the pressure sensor has a current consumption in a range from 1 mA to 10 mA and in the standby state has a current consumption in a range from 1 µA to 30 µA.

Example 20 is a sensor device according to any one of the examples 17 to 19, also comprising: a control unit electrically coupled to the pressure sensor, wherein the output signal comprises an alarm signal which is configured to wake the control unit out of a standby state.

Example 21 is a sensor device according to any one of the examples 17 to 20, the control unit comprising a microcontroller of a battery monitoring system or of a module monitoring system.

Example 22 is an electrochemical energy storage unit, comprising a sensor device according to any one of the examples 17 to 21.

Although specific implementations have been illustrated and described herein, it is obvious to the person skilled in the art that a plurality of alternative and/or equivalent implementations can replace the specific implementations shown and described, without departing from the scope of the present disclosure. This application is intended to include all modifications or variations of the specific implementations discussed herein. It is therefore intended that this disclosure is limited only by the claims and their equivalents.

The invention claimed is:

1. A method, comprising:
determining a first pressure increase in an electrochemical energy storage unit based on a first repetition rate;
detecting that the first pressure increase exceeds a first threshold value;
determining a second pressure increase in the energy storage unit based on a second repetition rate, the second repetition rate being greater than the first repetition rate;
detecting that the second pressure increase exceeds a second threshold value; and
outputting a signal to a control unit based on detecting that the second pressure increase exceeds the second threshold value.

2. The method as claimed in claim 1, wherein the signal comprises a wake-up signal configured to wake the control unit from a standby state.

3. The method as claimed in claim 1, wherein the control unit comprises a microcontroller of a battery monitoring system (BMS) or of a module monitoring system (MMS).

4. The method as claimed in claim 1, further comprising, based on the signal, at least one of:
outputting a warning signal;
relieving pressure from the energy storage unit;
switching off the energy storage unit; or
disconnecting the energy storage unit from an on-board electrical network.

5. The method as claimed in claim 1, further comprising:
detecting a thermal runaway of the energy storage unit based on detecting that the second pressure increase has exceeded the second threshold value.

6. The method as claimed in claim 1, wherein the determination of the first pressure increase comprises:
performing successive measurements of the absolute pressure in the energy storage unit at the first repetition rate, wherein the first pressure increase is based on a difference between two first consecutive measurements of the absolute pressure.

7. The method as claimed in claim 6, wherein a first time interval between the two first consecutive measurements is in a range from 10 ms to 5000 ms.

8. The method as claimed in claim 6, wherein the two first consecutive measurements directly follow each other.

9. The method as claimed in claim 1, wherein the determination of the second pressure increase comprises:
performing successive measurements of the absolute pressure in the energy storage unit at the second repetition rate, wherein the second pressure increase is based on a difference between two second consecutive measurements of the absolute pressure.

10. The method as claimed in claim 9, wherein a second time interval between the two second consecutive measurements has a value in a range from 10 ms to 500 ms or a multiple of this value.

11. The method as claimed in claim 9, further comprising:
performing a plurality of measurements of the absolute pressure in the energy storage unit between the two second consecutive measurements at the second repetition rate.

12. The method as claimed in claim 1, the first threshold value ($\Delta p1_{threshold}$) being in a range from 10mbar to 200mbar.

13. The method as claimed in claim 1, the second threshold value ($\Delta p2_{threshold}$) being in a range from 10mbar to 500mbar.

14. The method as claimed in claim 1, the energy storage unit comprising a battery for an electric vehicle.

15. The method as claimed in claim 14, wherein the method is carried out while the electric vehicle is in a stationary state.

16. The method as claimed in claim 1, the energy storage unit comprising a lithium-ion rechargeable battery.

17. A sensor device, comprising:
a pressure sensor, the pressure sensor being configured to:
determine a first pressure increase in an electrochemical energy storage unit based on a first repetition rate;
detect that the first pressure increase exceeds a first threshold value;
determine a second pressure increase in the energy storage unit based on a second repetition rate, the second repetition rate being greater than the first repetition rate;
detect that the second pressure increase exceeds a second threshold value; and
output a signal to a control unit based on the second pressure increase exceeding the second threshold value.

18. The sensor device as claimed in claim 17, the pressure sensor being configured to determine a pressure increase in the energy storage unit based on consecutive measurements of the absolute pressure in the energy storage unit, wherein the pressure sensor is in a measuring operating mode during the measurements and in a standby state between the measurements.

19. The sensor device as claimed in claim 18, wherein in the measuring operating mode the pressure sensor has a current consumption in a range of 1 mA to 10 mA and a current consumption in a range of 1 µA to 30 µA in the standby state.

20. The sensor device as claimed in claim 17, further comprising:
   a control unit electrically coupled to the pressure sensor, wherein the signal comprises a wake-up signal which is configured to wake the control unit from a standby state.

21. The sensor device as claimed in claim 17, the control unit comprising a microcontroller of a battery monitoring system or of a module monitoring system.

22. An electrochemical energy storage unit, comprising a sensor device as claimed in claim 17.

* * * * *